Patented Apr. 19, 1938

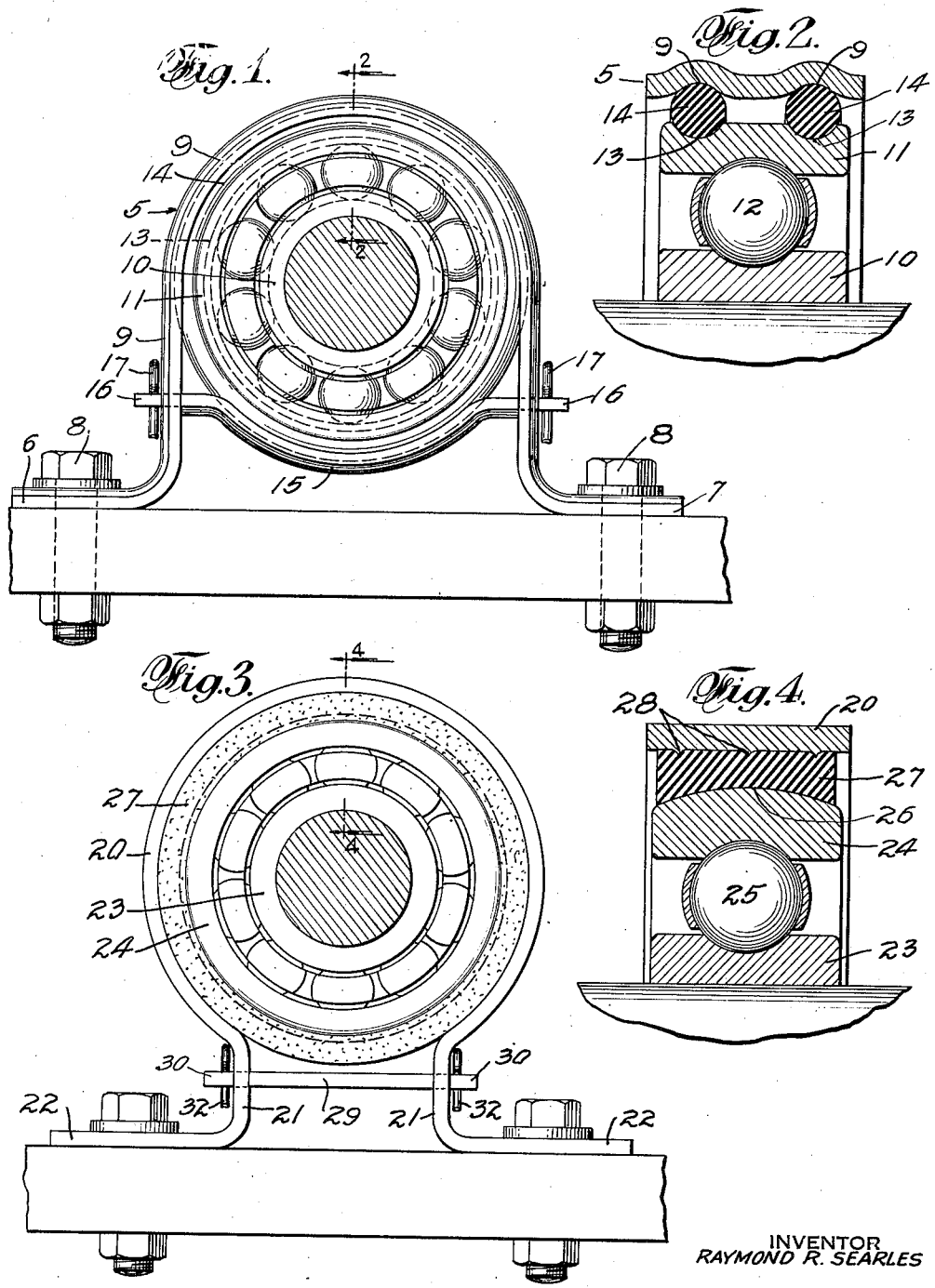

2,114,670

UNITED STATES PATENT OFFICE 2,114,670

PILLOW BLOCK

Raymond R. Searles, New Britain, Conn., assignor to The Fafnir Bearing Company, New Britain, Conn., a corporation of Connecticut Application February 11, 1936, Serial No. 63,345

7 Claims. (Cl. 308—184)

My invention relates to a pillow block or similar shaft mounting.

It is the principal object of my invention to provide a very simple inexpensive mounting of the character indicated which will be light, yet sufficiently sturdy for all ordinary purposes where relatively light loads are encountered.

It is a further object to provide a pillow block or like shaft mounting so constructed and arranged as to be very quiet in operation and capable of a degree of self-alignment and self-positioning.

Other objects and various features of invention will be hereinafter pointed out or will become apparent on a reading of the specification.

In the drawing which shows, for illustrative purposes only, preferred forms of the invention—

Fig. 1 is a side view in elevation of a pillow block illustrating features of the invention;

Fig. 2 is an enlarged fragmentary sectional view taken substantially in the plane of the line 2—2 of Fig. 1;

Fig. 3 is a view similar to Fig. 1 but illustrating a modified form of construction;

Fig. 4 is an enlarged sectional view taken substantially in the plane of the line 4—4 of Fig. 3.

My improved pillow block in the two forms here illustrated comprises a housing in the form of a strap which may be formed up of sheet metal and provided with means for attachment to a support. A bearing such as a ball bearing is held in the strap housing and a yielding means such as a rubber encircling band is interposed between the housing and the bearing.

In the embodiment illustrated in Figs. 1 and 2, 5 indicates generally a housing part in the form of a strap of metal bent into generally U-form to embrace the outer ring of an anti-friction bearing. The legs of the U may be bent to form feet 6—7 for attachment to any suitable support as by means of bolts 8—8. The strap housing 5 is preferably corrugated or channeled longitudinally as indicated at 9—9, the channels being spaced apart a distance somewhat less than the width of the bearing. The bearing may comprise a ball bearing in which 10 indicates an inner ring and 11 an outer ring. Anti-friction bearing members such as balls 12 are interposed between the rings and preferably run in races so that the bearing is of the unit handling type wherein the rings are held in position relatively to each other both axially and radially by means of the balls themselves. The bearing is mounted in the housing on or by means of a yielding or resilient means. In the form shown the outer ring 11 is provided with a pair of circumferential channels 13—13 at spaced apart points axially of the outer ring and the channels 13—13 are substantially opposite the corresponding channels 9—9 in the strap housing. Yielding, resilient or sound-deadening means in the form of a pair of rings 14—14 fit in the opposed channels of the outer ring and housing and thus serve to position the outer ring and consequently the entire bearing in the housing both axially and radially in at least one direction. A support and tie member 15 may be secured to the two legs of the U-shaped frame as by means of tongues 16—16 passing through apertures in the legs and held therein against dislodgment by means such as cotter pins 17—17. The supporting tie member in the form shown in Fig. 1 is curved to the general contour of the outer bearing ring and is channeled in a manner similar to the main strap housing and when the parts are assembled extends into engagement with the ring supports 14—14 so that the bearing is supported substantially all about the circumference. It may be stated that the strap housing, though quite stiff, due to the inherent stiffness of the metal and to the channels or corrugations therein, may be bent or sprung sufficiently to permit the ready introduction of the tongues 16—16 in the apertures in the legs of the U-shaped strap housing. The bearing is thus quite securely held in the strap housing and due to the formation of the housing the outer ring and resilient rings 14—14 will take reasonable thrust as well as radial loads. Furthermore, due to the resiliency of the rubber, the bearing will be to some extent self-aligning and self-positioning within the limits of the resiliency of the rubber supporting means. Furthermore, due to the sound-deadening or vibration absorbing qualities of the rubber or other supports 14—14 the bearing will be substantially quieter than other shaft mounts generally employed.

In that form of the invention shown in Fig. 3, 20 designates generally a housing strap bent into generally circular form so as to embrace substantially more than half the circumference of the outer ring of the bearing. This strap 20 is bent off at an angle to form legs 21—21 which may be bent outwardly into securing feet 22—22 which may be secured to a suitable support, as heretofore described. The bearing comprises an inner bearing ring 23, an outer bearing ring 24 and interposed anti-friction bearing members such as balls 25. The outer ring in the form shown in Figs. 3 and 4 instead of being recessed is bowed outwardly as indicated at 26, forming in effect opposed holding shoulders for an annulus or ring 27 of sound-deadening, yielding material such as rubber interposed between the outer ring and the embracing strap 20. The annulus 27 is preferably made to conform to the shape of the adjacent surfaces of the strap 20 and ring 26 and the strap 20 may also be provided with sharp tongues or projections 28 to dig into the annulus 27 and assist in holding the same against axial displacement. The bowing up of the outer surface of the outer ring 24 will serve to prevent axial displacement of the ring in the annulus 27 and also provide for a greater degree of self-alignment. Clearly, the annulus 27 could be made of a form to flange over the outside edges of the outer bearing ring so as to hold the latter against axial displacement. In that case the outer bearing ring may be a standard bearing ring having a truly cylindrical surface and need not be bowed or channeled or otherwise formed to hold itself in place. The legs 21—21 of the strap 20 may be positioned as by means of a tie plate 29 which may have end tongues 30—30 to pass through apertures in the legs and be held against displacement as by means of cotter pins 32—32. The metal of the strap 20 may be bent or sprung sufficiently to permit entry of the bearing and encircling annulus and when sprung back into the position shown in Figs. 3 and 4 will securely hold the bearing in place.

It will be seen that in both forms shown I have provided a shaft mounting in the form of a pillow block which consists of very few, very simply formed parts. The metal strap housing may be formed up out of sheet metal of appropriate thickness and is consequently very cheap to manufacture. The bearing will be quiet and will be sufficiently sturdy to permit its especially advantageous use in situations where relatively light loads are encountered and where so-called self-alignment is desired.

While the invention has been described in considerable detail and two forms illustrated, it is to be understood that various changes may be made within the scope of the invention as defined in the appended claims.

I claim:

1. A pillow block type of shaft mounting including inner and outer bearing rings with interposed anti-friction bearing members, a supporting strap embracing said outer bearing ring and having angularly extending foot portions for attachment to a support, sound-deadening means interposed between said outer bearing ring and said supporting strap, and a tie member above said foot portions for securing opposite sides of said supporting strap to each other.

2. A shaft mounting including inner and outer bearing rings with interposed anti-friction bearing members, a supporting strap embracing said outer bearing ring, said supporting strap having a circumferentially extending channel therein and said outer bearing ring having an opposed circumferentially extending channel therein, and a rubber ring fitting in said channels, for the purpose described.

3. A shaft mounting including inner and outer bearing rings with interposed anti-friction bearing members, said outer ring having a pair of spaced apart circumferentially extending channels in the outer surface thereof, a sheet metal strap embracing said outer ring and having circumferentially extending channels opposed to said channels in said outer bearing ring, and resilient rings mounted in said channels whereby said outer bearing ring will be resiliently supported in said strap.

4. A shaft mounting including inner and outer bearing rings with interposed anti-friction bearing members, a sheet metal U-shaped strap embracing said outer bearing ring for about half its circumference, said strap having feet thereon, with means for securing the same to a support, a tie member between the legs of said U-shaped strap and embracing a part of the circumference of said outer bearing ring and spaced from the support, and resilient means interposed between said outer bearing ring and said strap and tie member.

5. A shaft mounting including inner and outer bearing rings, with interposed anti-friction bearing members, a metal strap member embracing substantially more than half the circumference of said outer bearing ring, said strap having means for securing the same to a support, and resilient means interposed between said strap and said outer bearing ring, said resilient means being supported out of contact with the said support.

6. An anti-friction bearing including inner and outer bearing rings with interposed anti-friction bearing members, said outer ring having a circumferentially extending groove in the outer surface thereof and spaced axially from the plane of the race of said outer ring, and a rubber ring seated in said groove and adapted to support said bearing from a support in all directions.

7. An anti-friction bearing including inner and outer bearing rings with interposed anti-friction bearing members, said outer ring having a pair of axially spaced apart circumferentially extending grooves in the outer surface thereof, and a pair of rubber rings seated in said grooves and adapted to support said bearing from a support in all directions.

RAYMOND R. SEARLES.